United States Patent Office 3,748,154
Patented July 24, 1973

3,748,154
INTUMESCENT COATING COMPOSITION COMPRISING AROMATIC SULFONAMIDES
John J. Seipel, Ambler, Pa., and Shirley H. Roth, Highland Park, and Joseph Green, East Brunswick, N.J., assignors to Cities Service Company, New York, N.Y.
No Drawing. Filed Jan. 11, 1972, Ser. No. 216,983
Int. Cl. C09d 5/14, 5/16; C09k 3/28
U.S. Cl. 106—15 FP                              6 Claims

ABSTRACT OF THE DISCLOSURE

A binder showing thermal change at a suitable temperature is used to dissolve or disperse an aromatic sulfonamide intumescent agent bearing a nuclear substituent which is linked to the aromatic ring through a nitrogen atom. Among the preferred binders are suitable vinyl chloride/vinylidene chloride and vinyl chloride/vinyl acetate copolymers, chlorinated rubber, and chlorinated or chlorosulfonated polyethylenes. The preferred intumescent agents are p-aminobenzene sulfonamide and p-acetamidobenzenesulfonamide.

BACKGROUND OF THE INVENTION

Field of the invention

This invention relates to intumescent coating compositions and more particularly relates to such compositions comprising an aromatic sulfonamide and a binder therefor.

Description of the prior art

As disclosed in copending application Ser. No. 211,636, filed Dec. 23, 1971, in the names of Shirley H. Roth and Joseph Green, a substrate may advantageously be protected from heat and fire by the application thereto of an intumescent composition comprising a novel one-component intumescent agent. This intumescent agent is an aromatic sulfonamide bearing a nuclear substituent which is linked to the aromatic ring through a nitrogen atom. Although these intumescent agents may be applied to the substrate to be protected without the use of a binder, the use of a binder is preferred. However, it has been found that many binders useful in intumescent compositions of the prior art are unsatisfactory for use with the new intumescent agents.

SUMMARY OF THE INVENTION

An object of this invention is to provide intumescent coating compositions comprising an aromatic sulfonamide and a binder.

Another object is to provide such compositions wherein the binder permits intumescence of the aromatic sulfonamide to a stable foam char.

These and other objects are attained by dissolving or dispersing an intumescent agent corresponding to the formula:

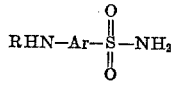

wherein Ar is a divalent aromatic residue and R is hydrogen or a hydrocarbon, halohydrocarbon, or acyl radical in a binder showing thermal change, such as decomposition, beginning between about 60° C. below the temperature at which the neat intumescent agent begins to decompose and intumesce and about 40° C. below the temperature at which the neat intumescent agent ceases intumescing, all temperatures being those determined by differential scanning calorimetry (DSC) in a nitrogen atmosphere at a scanning rate of 10° C./min.

DESCRIPTION OF THE PREFERRED EMBODIMENTS

The intumescent agents of the invention may be any compounds corresponding to the above formula. However, they are preferably compounds wherein Ar is a divalent aromatic residue derived from benzene or naphthalene or an alkyl, haloalkyl, alkoxy, haloalkoxy, halo, hydroxy, carboxy, amino, amido, or nitro derivative thereof. When the aromatic ring bears organic substituents, it is usually preferred that these substituents contain 1–5 carbon atoms. When there are halo substituents, it is usually preferred that they be chloro or bromo. It is also preferred that the aromatic ring have at least one free reactive position.

As indicated above, R of the formula may be hydrogen or a hydrocarbon, halohydrocarbon, or acyl radical, e.g., an alkyl, chloroalkyl, or bromoalkyl radical containing 1–5 atoms, a phenyl, chlorophenyl, or bromophenyl radical, or an aliphatic or aromatic acyl radical.

Exemplary of the intumescent agents of the invention are p-aminobenzenesulfonamide,
2-amino-4-chlorobenzenesulfonamide,
2-amino-4-bromobenzenesulfonamide,
4-amino-2-ethylbenzenesulfonamide,
3-amino-4-chloromethylbenzenesulfonamide,
4-amino-2-butoxybenzenesulfonamide,
4-amino-3-chloromethoxybenzenesulfonamide,
4-amino-3-carboxybenzenesulfonamide,
3,4-diaminobenzenesulfonamide,
4-amino-2-acetamidobenzenesulfonamide,
2-amino-4-nitrobenzenesulfonamide,
4-methylaminobenzenesulfonamide,
4-chloroethylaminobenzenesulfonamide,
2-bromoethylaminobenzenesulfonamide,
4-phenylaminobenzenesulfonamide,
4-(p-chlorophenylamino)benzenesulfonamide,
4-(p-bromophenylamino)benzenesulfonamide,
p-acetamidobenzenesulfonamide,
p-benzamidobenzenesulfonamide, the corresponding naphthalenesulfonamides, etc. The preferred intumescent agents include p-aminobenzenesulfonamide and p-acetamidobenzenesulfonamide. When not readily available, these compounds may be prepared by known techniques.

When these intumescent agents are heated, they decompose and intumesce, generally at temperatures in the range of about 200–400° C., as determined by DSC in a nitrogen atmosphere at a scanning rate of 10° C./min. The particular temperatures at which a particular neat intumescent agent begins to decompose and intumesce and ceases intumescing are easily determined by routine experimentation. For example, determined as indicated above, neat p-aminobenzenesulfonamide begins to decompose and intumesce at about 235° C. and ceases intumescing at about 355° C.; neat p-acetamidobenzenesulfonamide begins to decompose and intumesce at about 220° C. and ceases intumescing at about 355° C. The temperatures may also be determined by other techniques, such as differential thermal analysis.

The binder employed in the practice of the invention may be any resin showing thermal change beginning between about 60° C. below the temperature at which the neat intumescent agent begins to decompose and intumesce and about 40° C. below the temperature at which the neat intumescent agent completes intumescing. Binders showing thermal change below or above this temperature range generally do not permit the aromatic sulfonamide to intumesce to a stable foam char. It is particularly unexpected that the time of thermal change of the binder should be the criterion of its operability, since the prior art would indicate that only its chemical composition would be determinative of its usefulness. In the present invention, the binder's chemical composition, per se, is not a criterion of its operability. Thus, a variety of types of binders may be used, alone or in combination.

Exemplary of utilizable types of binders are cellulose ethers, such as methyl cellulose, ethyl cellulose, etc.; polyurethanes; melamine- and urea-formaldehyde resins; polysulfide resins; epoxy resins; chlorinated rubber; chlorinated and chlorosulfonated polymers of alkenes containing 2–4 carbon atoms (i.e., ethylene, propylene, and butylene), such as chlorinated polyethylene, chlorosulfonated polyethylene, etc.; vinylidene polymers, such as homopolymers and interpolymers of vinyl halides (e.g., vinyl chloride, etc.), vinyl esters (e.g., vinyl acetate, etc.), vinylidene halides (e.g., vinylidene chloride, etc.), monovinylidene aromatic monomers (e.g., styrene, etc.), conjugated dienes containing 4–6 carbon atoms (e.g., butadiene-1,3- isoprene, chloroprene, piperylene, dimethylbutadiene-1,3, etc.), acrylonitrile, methacrylonitrile, alkyl(meth) acrylates wherein the alkyl group contains 1–20 carbon atoms (e.g., methyl acrylate, 2-ethylhexyl acrylate, the corresponding methacrylates, etc.), etc. Particularly preferred binders are chlorinated rubber, vinyl chloride/vinylidene chloride and vinyl chloride/vinyl acetate copolymers and chlorinated and chlorosulfonated polyethylenes. It is understood, of course, that utilizable resins of these types must show thermal change at a suitable temperature.

The compositions of the invention are prepared by dissolving or dispersing the intumescent agent in the binder in a weight ratio of about 0.075–14/1. When desired, the composition may also contain up to about 70% by weight, based on the total composition, of one or more of the other ingredients conventionally used in intumescent compositions, e.g., stabilizers, dispersing agents, pigments, driers, biocides, antifoamers, thickeners, protective colloids, fillers, blowing agents, etc.

The composition may be applied to the substrate to be protected, e.g., a wood, metal, or plastic substrate, in any suitable manner, such as by fluidized bed coating, spraying, electrodeposition, etc. However, it is preferably applied in the form of a paint having a solids content of about 10–70% by weight and comprising a dispersion in a suitable liquid medium, e.g., water or a solvent or solvent mixture. Regardless of the method used to apply the intumescent coating, it is preferably applied so as to deposit a coating having a dry thickness of about 0.001–0.075 inch.

The use of the binders of the invention allows the aromatic sulfonamides to intumesce to stable foam chars having good volume and cell structure. The coating compositions, when tested in accordance with the two-foot tunnel test mentioned below, have desirable flame spreading ratings, e.g., lower than 50, frequently lower than 25, and good insulative values.

The following examples are given to illustrate the invention and are not intended as a limitation thereof. Unless otherwise specified, parts mentioned are parts by weight.

EXAMPLE I

Ball mill a mixture of 84 parts of p-aminobenzenesulfonamide, 27 parts of a vinyl chloride/vinylidene chloride copolymer having a decomposition temperature of about 260° C., 6 parts of titanium dioxide, and 105 parts of methyl ethyl ketone to form a coating composition. Apply the composition to four poplar test panels to form films having a dry thickness of 0.024 inch. Test the panels in accordance with the two-foot tunnel test described in H. L. Vandersall, "The Use of a Small Flame Tunnel for Evaluating Fire Hazard," Journal of Paint Technology, vol. 39, No. 511, pp. 494–500 (1967). The panels have an average flame spread rating of 24.

EXAMPLE II

Repeat Example I except for preparing the coating composition from 100 parts of p-acetamidobenzenesulfonamide, 32 parts of a chlorinated polyethylene having a decomposition temperature of about 300° C., 7.5 parts of titanium dioxide, and 125 parts of xylol and forming films having a dry thickness of about 0.013 inch. The panels have an average flame spread rating of 22.

As demonstrated above, intumescent coating compositions having flame spread ratings less than 50 are obtained when an aromatic sulfonamide is compounded with a binder having a thermal activity point in the range of about 260–300° C. Similar results are observed when the binder having a suitable thermal activity point is a vinyl chloride/vinyl acetate copolymer, a chlorinated rubber, or a chlorosulfonated polyethylene.

It is obvious that many variations may be made in the products and processes set forth above without departing from the spirit and scope of this invention.

What is claimed is:

1. An intumescent coating composition comprising
   (A) about 0.075–14 parts by weight of an intumescent agent corresponding to the formula:

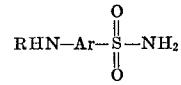

wherein (1) Ar is a divalent aromatic radical derived from benzene or naphthalene or an alkyl, chloroalkyl, bromoalkyl, alkoxy, chloroalkoxy, bromoalkoxy, chloro, bromo, hydroxy, amino, acetamido, or nitro derivative thereof in which any organic substituent on the aromatic ring contains 1–5 carbon atoms and (2) R is hydrogen, an alkyl, chloroalkyl, or bromoalkyl radical containing 1–5 carbon atoms, or a phenyl, chlorophenyl, bromophenyl, acetamido, or benzamido radical and
   (B) one part by weight of a resin binder showing thermal change beginning about 60° C. below the temperature at which the neat intumescent agent begins to decompose and intumesce and about 40° C. below the temperature at which the neat intumescent agent ceases intumescing.

2. The composition of claim 1 wherein the binder is a cellulose ether, a polyurethane, a polysulfide resin, an epoxy resin, a melamine- or urea-formaldehyde resin, a vinylidene polymer, a chlorinated rubber and/or a chlorinated or chlorosulfonated polymer of an alkene containing 2–4 carbon atoms.

3. The composition of claim 1 wherein the intumescent agent is p-aminobenzenesulfonamide.

4. The composition of claim 3 wherein the binder has a decomposition temperature in the range of about 175–315° C. and is a cellulose ether, a polyurethane, a polysulfide resin, an epoxy resin, a melamine- or urea-formaldehyde resin, a vinylidene polymer, a chlorinated rubber and/or a chlorinated or chlorosulfonated polymer of an alkene containing 2–4 carbon atoms.

5. The composition of claim 1 wherein the intumescent agent is p-acetamidobenzenesulfonamide.

6. The composition of claim 5 wherein the binder has a decomposition temperature in the range of about 160–315° C. and is a cellulose ether, a polyurethane, a polysulfide resin, an epoxy resin, a melamine- or urea-formaldehyde resin, a vinylidene polymer, a chlorinated rubber and/or a chlorinated or chlorosulfonated polymer of an alkene containing 2–4 carbon atoms.

References Cited

UNITED STATES PATENTS

| | | | |
|---|---|---|---|
| 2,031,206 | 2/1936 | Bren | 260—556 A R |
| 2,138,934 | 12/1938 | Moss | 260—556 A R |
| 2,410,635 | 11/1946 | Craver | 260—556 A R |
| 2,600,455 | 6/1952 | Wilson et al. | 106—15 F P |
| 3,337,357 | 8/1967 | Strobel et al. | 106—178 |
| 3,097,217 | 7/1963 | Zienty | 260—45.7 S |

JOAN B. EVANS, Primary Examiner

U.S. Cl. X.R.

106—16; 117—137; 252—8.1